United States Patent [19]
Rendina

[11] Patent Number: 5,980,749
[45] Date of Patent: Nov. 9, 1999

[54] INCLUSION METHODS FOR PURIFYING A SOLVENT

[75] Inventor: David Deck Rendina, Vancouver, Canada

[73] Assignee: Light Year Technologies (USA) Inc.

[21] Appl. No.: 09/088,947

[22] Filed: Jun. 2, 1998

[51] Int. Cl.⁶ .................................................... B01D 11/00
[52] U.S. Cl. ...................... 210/633; 210/634; 210/639; 210/643; 210/716; 423/55; 423/65
[58] Field of Search .................................. 210/633, 634, 210/639, 643, 708, 702, 723, 724, 716; 75/231; 423/55, 65, 53, 62

[56] References Cited

U.S. PATENT DOCUMENTS

| | | | |
|---|---|---|---|
| 4,822,590 | 4/1989 | Morrison et al. | 423/561.1 |
| 4,853,359 | 8/1989 | Morrison et al. | 502/220 |
| 4,946,596 | 8/1990 | Furuta et al. | |
| 4,996,108 | 2/1991 | Divigalpitiya et al. | 428/411.1 |
| 5,037,552 | 8/1991 | Furuta et al. | |
| 5,282,882 | 2/1994 | Galvin et al. | |
| 5,328,618 | 7/1994 | Miremadi et al. | 252/30 |
| 5,330,658 | 7/1994 | Grant et al. | 210/717 |

*Primary Examiner*—David A. Simmons
*Assistant Examiner*—Fred Prince

[57] ABSTRACT

Disclosed are methods for purifying solvents, by causing contaminants to be included within layers of dispersed layered materials, and then separating the restacked combined contaminant/layered material from the solvent. The methods may be utilized to remove materials suspended in the solvents, materials immiscible with the solvents, and are especially useful for separating soluble materials from the solvents within which they are dissolved. The application of these methods will be beneficial in the remediation of polluted soil and water, the desalination of water, waste oil and gray water purification, the preparation of pharmaceuticals, and many other areas.

13 Claims, No Drawings

INCLUSION METHODS FOR PURIFYING A SOLVENT

FIELD OF THE INVENTION

The present invention relates primarily to the field of water purification. Disclosed are methods for purifying solvents, by causing contaminants to be included within restacked layers of dispersed layered materials, and then separating the combined contaminant/layered material from the solvent. The methods may be utilized to remove materials suspended in the solvents, materials immiscible with the solvents, and are especially useful for separating soluble materials from the solvents within which they are dissolved. The application of these methods will be beneficial in the remediation of polluted soil and water, the desalination of water, waste oil and gray water purification, the preparation of pharmaceuticals, and many other areas.

PRIOR ART

There are many physical methods by which suspended and/or immiscible materials may be removed from a solvent. For example, the application of centrifugal force and various filtration techniques are common methods employed to achieve these goals. There are also many known methods for separating solutes from the solvents within which they are dissolved. Among these are aerobic and anaerobic biological purification, distillation processes, electrolysis, and various membrane filtration and ion exchange techniques. Although these methods are ideal for certain applications they are ineffective, produce undesirable by-products, or are cost prohibitive in others.

Many precipitation, flocculation, and coagulant techniques are also known, such as those described in U.S. Pat. No. 5,330,658 to Grant et al., and in Canter, L. W., and Knox, R. C., Deborah Fairchild, Ground Water Quality Protection, Lewis Publishers, Inc. 1987, pp. 467–498. All of these methods are relatively complicated and expensive.

Although many examples exist where layered materials such as carbon, zeolites, and others, are employed as impurity adsorbents, the properties of the layered materials employed in the current invention rely solely on the surface qualities of the materials. No adsorption or bonding is required.

It is known that unmodified layered materials such as transition metal dichalcogenides, pillared clays, and the like, dispersed in solutions, will entrap quantities of water and other materials that are also dispersed in the solution when the layered materials drop out of suspension. For example, Miremadi et al., in U.S. Pat. No. 5,328,618 discloses a method for producing a magnetic lubricant by entrapping metal salts between layers of settled layered materials. However, if these unmodified layered materials are employed to purify solvents the economics are not advantageous. This is because of the ratio of the quantity of layered material needed to remove a given quantity of contaminants is high.

Morrison et al., in U.S. Pat. No. 4,822,590 has disclosed exfoliation methods, resulting in single molecular thickness materials, homogeneously dispersed and suspended in a solution. These materials are described as novel single layer materials of the form MX(2), where MX(2) is a layer-type dichalcogenide such as $MoS_2$, $TaS_2$, $Ws_2$, or the like. The exfoliation method described is through intercalation of the dichalcogenide by an alkali metal and immersion in water or other protic solvents. It is clear that this process significantly reduces the size of the suspended particles of layered materials. Thus it produces a significant increase in the number of layers within which other materials may be trapped. This factor reduces the quantities of layered materials needed to remove a given contaminant from a solvent. Thus, the economic factors involved when employing these layered materials to purify solvents are improved.

U.S. Pat. No. 4,853,359 to Morrison et al., and U.S. Pat. No. 4,996,108 to Divigalpitiya et al., as well as the inventors own pending U.S. patent applications Ser. Nos. 08/775,873 and 09/060,189, describe unique new materials which may be formed by coating, or including, selected materials between layers of these exfoliated materials. Variously described in these disclosures are means for capturing; particles suspended in a protic solvent, materials immiscible in protic solvents, and dissolved materials such as metal salts dissolved in water and metal hydrides dissolved in organic solvents etc. However, the objects of all these inventions are the new materials created when the exfoliated materials are combined with materials recovered from the suspensions or solutions. None of these describe the benefits that may be achieved when these exfoliated materials are employed to purify the solvents.

OBJECT OF THE INVENTION

One of the principal problems faced by industrial societies is the pollution caused by toxins suspended, immiscible, or dissolved in our water. Many of these pollutants may be removed at a relatively low cost by conventional physical means such as centrifuging or filtering. However, pollutants dissolved in water cannot be removed by these methods and are very difficult to remove in a cost-effective manner. Because they are energy intensive, or require relatively complex processes, known methods are particularly costly when used to cleanup large quantities of water where the dissolved pollutants may comprise only a few parts per million. It would be beneficial if methods could be found whereby relatively small quantities of dissolved toxic materials could be removed from significantly larger quantities of water in a cost effective manner.

In many areas of the world economic development is stymied because salts heavily contaminate the only water available. Conventional desalination plants are expensive and require extensive infrastructures. It would often be beneficial if desalination could be effected by simpler, less costly methods.

In certain emergency situations such as earthquakes, floods, etc., drinking water may be contaminated by a variety of suspended, immiscible, and dissolved materials. It would be beneficial in these cases if low tech, low energy methods could be developed to remove all of these materials from the water with a simple one-step process.

Further, many industrial and experimental procedures, particularly in the semi-conductor, food processing and pharmaceutical industries, require high purity solvents to eliminate the possibility of contamination of the desired product.

What is needed is a simple, easy-to-operate method for purifying large volumes of solvents, especially water, containing suspended, soluble, and insoluble contaminants, singly or in combination, which effectively segregates the contaminants from the clean solvent and concentrates the contaminated material in a manageable, low volume, concentrated waste that inhibits the resolubilization or suspension of the contaminants.

SUMMARY OF THE INVENTION

These and other needs are satisfied by the invention which is characterized by methods for substantially purifying contaminated protic solvents, and contaminated water miscible aprotic solvents, including combinations and mixtures thereof, said solvents being contaminated by particles suspended in the solvents, materials dissolved in the solvents, and/or solutions immiscible in the solvents, comprised of means, applied singly or in combination, for dispersing suspensions of layered materials in said solvents in ways that cause the contaminants in the mixture to be included between layers of layered materials, and separating the concentrated restacked material with included contaminants from the purified solvent.

These inclusion methods for purifying solvents are most effective where the pH of the solvent is sufficiently high so as to inhibit the immediate flocculation of the layered material. In addition, the suspension of layered material must be combined with the solvent in a manner that will effectively include the contaminants.

Therefore the methods of the present invention are also comprised of means to adjust the pH of the solvent and also of means to effectively mix suspensions of layered materials with said contaminated solvents.

The inclusion of the contaminants within layers of the dispersed layered material causes the combined contaminant/layered material to concentrate and restack at either, or both, the bottom or the top of the mixing container. Thus the solvent that remains is purified. Therefore the present invention is also comprised of means to separate the purified solvent from the concentrated restacked material.

In the context of this disclosure, protic solvents refer to solvents that donate hydrogen, Such as water, alcohol, ethanol, and the like. Water miscible aprotic solvents refers to polar solvents which do not donate hydrogen and do not form separate layers when mixed with water, such as tetrahydrofuran, dimethylformamide, and the like. The said layered materials are preferably exfoliated layered materials that may be exfoliated by known methods, for example by first being intercalated with an alkali metal and then exfoliated by immersion in a protic solvent. The preferred exfoliated materials are exfoliated transition metal dichalcogenides of the form $MX_2$, where M is selected from the group Mo, W, Ta, Nb, Va, and X is Sulfur or Selenium. It is also preferred that the exfoliated materials be suspended in solvents.

Although the inventor does not wish to be bound by any particular theory, it is known that the exfoliation process causes the single molecular particles of layered materials to be separated by quantities of solvent. Thus the number of layers within which materials may be captured is greatly increased. This capturing, or inclusion, of the solvent between layers is the crucial factor that keeps particles of the layered materials separate from other layered particles in the suspension. It is apparent that if the solvent inclusion is pure, the suspended exfoliated materials remain in suspension, and resist settling even when subjected to sustained applications of centrifugal force. However, if the solvent is impure, it is believed that the impurities are also included with the solvent, between the layers of the exfoliated material and that their combined specific gravity, or immiscibility cause the particles in suspension to segregate. Exfoliated materials with inclusions of impure solvent either quickly settle to the bottom or rise to the top, while exfoliated materials with pure solvent inclusions tend to remain in the middle. When the exfoliated materials settle, they are believed to be separated by a relatively tenacious, bi-molecular layer of solvent. Any solute or suspended contaminate will also be included. Where the contaminant is immiscible, the exfoliated material includes both the miscible and immiscible materials and collects at the interface of the two liquids.

Further, although it is not necessary that the exfoliated materials form single molecular layers in suspension, it is preferred, that these suspensions contain a portion of single molecular layer materials. In the context of this disclosure single molecular materials in suspension are defined as, individual molecules of suspended layered material separated from every other molecule of suspended layered material by at least one molecule of solvent.

EXAMPLE 1

A sample of contaminated water reportedly removed from a ship's bilge and containing a variety of organic materials, detergents, and dissolved metals was obtained from Comprehensive Water Management Inc., of Delta, British Columbia. On inspection of the sample it was noted that the liquid was a cloudy dark brown color with a strong smell usually associated with organic material, that particulate matter could be clearly seen in suspension, and that on shaking a persistent foam formed at the air to liquid interface. An analysis was performed on a quantity of the sample, using ICP, to determine the level of dissolved metals in the sample. Two grams of as received $MoS_2$ supplied by Aldrich Chemicals with a reported purity of 99.5% was added to the sample and shaken vigorously then stirred continuously for one half hour at medium speed with a magnetic stirrer. When removed from the stirrer the $MoS_2$, rapidly settled to the bottom of the container. The liquid was slightly lighter in color. The liquid was decanted and a portion removed for analysis by ICP to determine the level of dissolved metals remaining in the sample. The results are summarized in Table 1.

TABLE 1

ANALYTICAL REPORT
Boron contaminated wastewater (BTEX) pH7

| Minimum detectable amount (PPM) | Quantity (PPM) Before treatment | Quantity (PPM) After treatment |
| --- | --- | --- |
| Arsenic dissolved 0.04 | 2.43 | 1.17 |
| Boron dissolved 0.008 | 157 | 109 |
| Calcium dissolved 0.01 | 803 | 591 |
| Magnesium dissolved 0.02 | 639 | 525 |
| Phosphorous dissolved 0.04 | 259 | 166 |
| Potassium dissolved 0.4 | 682 | 556 |
| Sodium dissolved 0.01 | 6190 | 5290 |
| Strontium dissolved 0.001 | 2.28 | 1.72 |
| Thallium dissolved 0.02 | 0.13 | <0.02 |
| Zinc dissolved 0.002 | 24.4 | 6.22 |

This clearly demonstrates that layered materials can be employed to remove dissolved impurities from water.

EXAMPLE 2

A suspension containing two grams of exfoliated $MoS_2$ was added to the same quantity of the contaminated bilge water sample as in the previous example. The sample was vigorously shaken and stiffed in a similar manner. The suspended $MoS_2$ settled more slowly and in addition, a layer of exfoliated material formed at the air to water interface. The liquid in the center was significantly lighter in color. A sample of the center liquid was extracted by pipette and analyzed by ICP for dissolved metals. The results are summarized in Table 2.

TABLE 2

ANALYTICAL REPORT
Boron contaminated wastewater (BTEX) pH7

| Minimum detectable amount (PPM) | Quantity (PPM) Before treatment | Quantity (PPM) After treatment |
|---|---|---|
| Arsenic dissolved 0.04 | 2.43 | 0.29 |
| Boron dissolved 0.008 | 157 | 25.4 |
| Calcium dissolved 0.01 | 803 | 114 |
| Magnesium dissolved 0.02 | 639 | 109 |
| Phosphorous dissolved 0.04 | 259 | 40.2 |
| Potassium dissolved 0.4 | 682 | 113 |
| Sodium dissolved 0.01 | 6190 | 1130 |
| Strontium dissolved 0.001 | 2.28 | 0.283 |
| Thallium dissolved 0.02 | 0.13 | 0.04 |
| Zinc dissolved 0.002 | 24.4 | 1.26 |

This clearly demonstrates that exfoliated layered materials are more efficient than unexfoliated materials at removing dissolved metals from water.

At around pH2 the exfoliated material agglomerates and the material becomes less efficient at removing impurities. At pH levels above about 9 the exfoliated materials tend to remain in suspension for longer periods. The pH of the solvent may either be adjusted by adding a suitable conditioner before addition of the layered material, or the pH of the suspension of layered material may be adjusted so that adding it to the solvent will neutralize it.

EXAMPLE 3

A sample of acid mine drainage, pH3, reportedly collected by the British Columbia, Ministry of Mines from a site known as Britannia mines was analyzed by standard methods using ICP to determine the quantities of dissolved metals in the liquid. The pH of the mine drainage was brought to neutral by the addition of a quantity of lithium hydroxide. A neutral suspension of exfoliated material was also prepared. The prepared suspensions was added in stages to a quantity of the acid mine drainage. After each addition of the suspension to the acid mine drainage, the combined liquids were mixed thoroughly with a magnetic stirrer. When removed from the stirrer the suspension cleared, and an agglomeration of black material rapidly settled to the bottom of the container. The clear liquid was decanted and a second analysis was conducted. The analytical results for selected contaminants are shown below in table 3.

TABLE 3

ANALYTICAL REPORT
Contaminated mine drainage (Britannia)

| Minimum detectable amount (PPM) | Quantity pH3 (PPM) Before treatment | Quantity pH7 (PPM) After treatment |
|---|---|---|
| Calcium dissolved 0.01 | 378.0 | 0.06 |
| Copper dissolved 0.001 | 10.0 | 0.006 |
| Lead dissolved 0.02 | 0.04 | <0.02 |
| Manganese dissolved 0.002 | 3.67 | <0.002 |
| Magnesium dissolved 0.02 | 60.5 | 0.154 |
| Strontium dissolved 0.001 | 2.07 | <0.001 |
| Zinc dissolved 0.002 | 24.1 | 0.008 |

These results clearly demonstrate that the addition of pH modifiers to solutions will not inhibit the ability of suspensions of exfoliated materials to remove dissolved metals from solutions.

The methods required to effectively mix the layered materials with the solvents depend largely on the type of materials to be removed. Stirring or applying methods, which cause the suspension of layered materials to meet in a counter flow with the contaminated solvents, is apparently effective for capturing most dissolved metals. However, in order to capture materials with a specific gravity significantly lower than the solvent, or which are immiscible in the solvent, more active forms of agitation such as shaking or bubbling to form an emulsion must be employed.

EXAMPLE 4

A sample of exfoliated $WS_2$ was prepared by methods known to produce a mixture of single and multi-layer particles in suspension. This sample was centrifuged for approximately 15 minutes at 3000 rpm and a black paste containing single and multi-layer materials, separated by layers of entrapped water, was recovered.

The exfoliated material/water paste was mixed, by stirring, in stages with the contaminated sample. The same process of agglomeration reported in example 1 occurred. The brown color of the liquid changed to a pale yellow. However, a point was reached in the addition of the exfoliated material where the color change did not occur as rapidly. At this point the sample was vigorously shaken. A foam emulsion was created at the air to water interface. As new material was added and the shaking continued, the foaming decreased significantly in quantity and persistence.

When allowed to settle, a clear delineation of materials occurred. Some of the black exfoliated material formed a layer at the air to water interface, and some settled to the bottom of the container. The color of the liquid in the middle rapidly changed from pale yellow to clear and colorless. On noting the removal of the color from the liquid the addition of exfoliated material was stopped. It is believed that the layer at the top contained exfoliated material with inclusions of organic material and phosphates. The material settling to the bottom is believed to have contained dissolved metals and previously suspended particulate matter. The clear liquid from the middle layer was extracted. It was colorless, had a slight smell of alcohol, and produced a light, easily dispersed, foam on shaking. This liquid sample was analyzed using ICP for selected dissolved metals. The results are described in Table 4.

TABLE 4

ANALYTICAL REPORT
Boron & Molybdenum and Organic
contaminated wastewater (BTEX) pH7

| Minimum detectable amount (PPM) | Quantity (PPM) Before treatment | Quantity (PPM) After treatment |
|---|---|---|
| Arsenic dissolved 0.04 | 0.32 | <0.04 |
| Boron dissolved 0.008 | 157 | 25.4 |
| Molybdenum dissolved 0.004 | 5.16 | 0.199 |
| Phosphorous dissolved 0.04 | 259 | 40.2 |
| Zinc dissolved 0.002 | 24.4 | 1.26 |

These results clearly demonstrate that suspended, immiscible, and dissolved materials were removed from the solvent by the addition of exfoliated material. It is also evident that not all of the exfoliated material need be single layer. Further, that active agitation such as shaking or bubbling in such a manner so that an emulsion is formed is more effective at removing certain contaminates than simply stirring.

Finally, aprotic miscible solvents may also be purified in this manner.

EXAMPLE 5

Magnesium hydride was dissolved in tetrahydrofuran by known methods. The resulting solution was a deep red color. A suspension of exfoliated $MoS_2$ in tetrahydrofuran was added in drops to the hydride solution. The dissolved magnesium was rapidly captured as inclusion within the layers of exfoliated material and settled out of solution forming a black cake at the bottom of the sample container. The color of the remaining liquid was a clear with a pale orange tint and consisted of substantially pure tetrahydrofuron.

It will be understood by someone skilled in the art that many of the details provided above are by way of example only and can be varied or omitted without departing from the scope of the invention which is to be interpreted with reference to the following claims:

What is claimed is:

1. A method for purifying a contaminated solvent, said solvent contaminated by particles suspended in said solvent, and/or materials dissolved in, and/or solutions immiscible in said solvent, comprising the steps of: (a) dispersing a suspension of exfoliated layered material in said solvent, (b) mixing said suspension in said solvent so as to cause contaminants in said solvent to be included between layers of said exfoliated layered material; and, (c) separating a concentrate of restacked said layered material entrapping said contaminants as inclusions from said solvent.

2. The method of claim 1 further comprising an initial step of suspending said exfoliated layered material in a solvent so as to form said suspension.

3. The method of claim 1 further comprising an initial step of suspending said exfoliated layered material in a solvent, wherein said exfoliated layered material is exfoliated transition metal dichalcogenides.

4. The method of claim 1 further comprising the step of adjusting the pH of said solvent.

5. The method of claim 1 further comprising the step of adjusting the pH of said suspension.

6. The method of claim 1 wherein said step of dispensing said suspension in said solvent includes the steps of stirring said solvent and said suspension together.

7. The method of claim 1 wherein said step of mixing said suspension in said solvent comprises causing said solution and said suspension to flow together such that a direction of flow of said suspension is counter to a direction of flow of said solution.

8. The method of claim 1 wherein said step of mixing said suspension in said solvent comprises shaking said solution and said suspension together.

9. The method of claim 1 wherein said step of mixing said suspension in said solvent comprises creating an emulsion of said solution and said suspension.

10. The method or claim 1 wherein said step of separating a concentrate of restacked said layered material from said solvent comprises decanting said solvent.

11. The method of claim 1 wherein said step of separating a concentrate of restacked said layered material from said solvent comprises applying centrifugal force so as to separate said solvent from said restacked said layered material and decanting said solvent.

12. The method of claim 1 wherein said step of separating a concentrate of restacked said layered material from said solvent comprises by extracting said solvent.

13. A purification method for purifying a contaminated solvent without adsorption or chemical bonding of contaminants in said contaminated solvent, comprising the steps of:
   (a) suspending exfoliated transition metal dichalcogenides of the from $MX_2$, wherein M is selected from the group Mo, W, Ta, Nb, Va, and wherein X is S or Se, in a suspension;
   (b) vigorously nixing said suspension with said contaminated solvent;
   (c) maintaining pH of said solvent and said suspension within an optimal pH range so as to inhibit immediate flocculation and optimally re-stack said exfoliated transition metal dichalcogenides suspended in said suspension;
   (d) allowing said re-stacked and flocculated exfoliated transition metal dichalcogenides to coalesce as a concentrate;
   (c) separating said concentrate from said solvent.

* * * * *